United States Patent  [11] 3,581,109

[72] Inventors Tore Bertil Reinhold Olsson;
 Ake Valentin Nilsson, Karlskoga, Sweden
[21] Appl. No. 677,122
[22] Filed Oct. 23, 1967
[45] Patented May 25, 1971
[73] Assignee Aktiebolaget Bofors
 Bofors, Sweden
[32] Priority Apr. 3, 1967
[33] Sweden
[31] 4615/67

[54] CIRCUIT SYSTEM FOR PRODUCING AN OUTPUT SIGNAL FROM A VARIABLE AMPLITUDE SIGNAL WHEN THE AMPLITUDE OF SAID SIGNAL IS WITHIN A SELECTED RANGE
12 Claims, 7 Drawing Figs.
[52] U.S. Cl. .................................................... 307/235,
 178/6.8
[51] Int. Cl. ..................................................... H03k 5/20
[50] Field of Search ........................................... 178/6.8, 6
 (BWR), 7.1; 307/235

[56] References Cited
UNITED STATES PATENTS
3,005,045 10/1961 Shanahan ..................... 178/6.8
3,214,515 10/1965 Eberline ....................... 178/6.8
3,441,667 4/1969 Novacek ....................... 178/6.8

Primary Examiner—Robert L. Griffin
Assistant Examiner—Richard K. Eckert, Jr.
Attorney—Hane & Baxley ABSTRACT: There is disclosed a system for selecting and indicating the amplitude of the electron beam of a cathode-ray tube, and more particularly, a system in which a definite relationship is maintained between the output signal of a heat radiation sensitive detector and the intensity of heat radiations received by the detector. As a result, the amplitude of the output signal of the detector has a definite relationship to the temperature at the point of origin of the heat radiation. The system also includes means for accurately determining the specific area within a larger area from which heat radiation within a specific range of temperature originates.

PATENTED MAY 25 1971

INVENTORS
TORE BERTIL REINHOLD OLSSON
ÅKE VALENTIN NILSSON

BY Hane and Bayley

ATTORNEYS

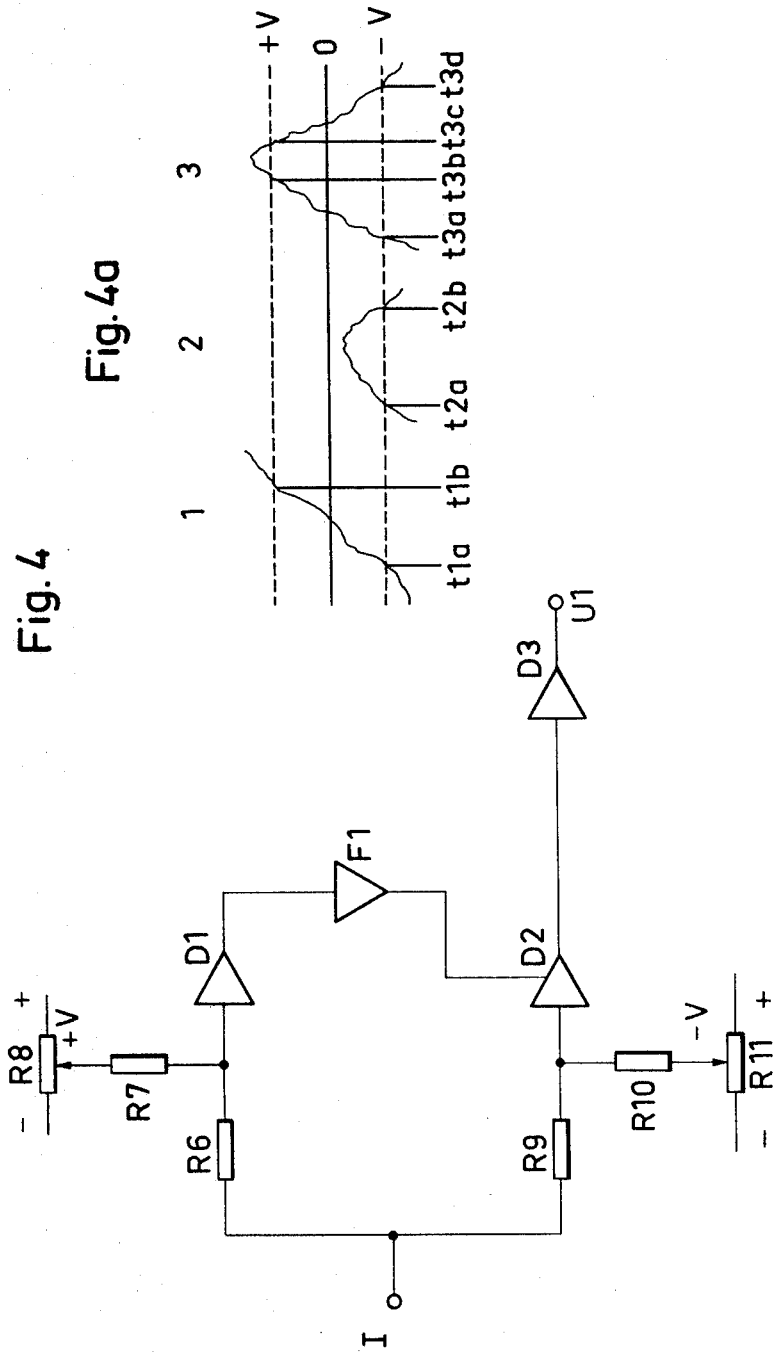

CIRCUIT SYSTEM FOR PRODUCING AN OUTPUT SIGNAL FROM A VARIABLE AMPLITUDE SIGNAL WHEN THE AMPLITUDE OF SAID SIGNAL IS WITHIN A SELECTED RANGE

BACKGROUND OF THE INVENTION

The present invention relates to an arrangement for cathode-ray tubes for amplitude selection and indication of the selected amplitudes. More specifically, the invention relates to circuit systems which include a cathode-ray tube in which a signal varying in time is passed to the intensity control grid of the cathode-ray tube and the cathode beam as modulated by this signal is simultaneously deflected in at least one direction.

It is a broad object of the invention to provide a novel and improved system of the general kind above referred to for indicating during the deflection of the beam of the tube when the signal passed to the intensity control grid has a selected value or is within predetermined limits.

Such indication is of particular importance in connection with infrared television cameras which scan an object emitting heat rays by means of an optical system. In such a system, a detection method is used such that there is present a definite relationship between the output signal obtained from a detector of heat radiation and the intensity of the heat radiation passed to the detector, and that the intensity of the radiation depends on the temperature at the point from which the radiation emanates. As a result, the amplitude of the output signal of the detector has a definite relationship to the temperature at the point of origin of the radiation.

Infrared television cameras of the type herein referred to are used more and more for medical diagnostic purposes, for instance, the possibility of determining the distribution of temperature within a certain area may be of considerable advantage. If scanning is effected in two directions at right angles to one another, by using suitable means an image which, for instance, may be supposed to represent a human face, is obtained on the picture screen of the cathode-ray tube. This image is visible as a black and white image where the blackening or density is a function of the temperature at different points on the face. However, it is difficult to evaluate small temperature differentials or to ascertain all points at which the same temperature prevails.

SUMMARY OF INVENTION

By means of the present invention, it is possible to select from within the entire area of the scanned picture all areas in which the same temperature prevails. Such selection is made by selecting from the signal which in a conventional manner produces the image in the form of a plurality of lines which are repetitively traced on the screen of the cathode ray tube, each said image representing at each moment of time the temperature conditions of the scanned object, such as the face of a person, those portions of the signal which have a selected value or are within selected limits.

In order to separate clearly those areas or sections of the image on the screen of the cathode-ray tube, the blackening or density of which correspond to the selected value or range of values, the system of the invention provides that the electron beam of the cathode-ray tube is caused to obtain a limit value with regard to intensity, that is, either obtain a value with corresponds to a high light intensity or to darkness on the picture screen, each time an area or section within the selected values is contacted.

In other words, the present invention utilizes amplitude selection and indication of the selected amplitudes of the beam of a cathode ray tube which is deflected in at least one direction. The invention is of particular advantage for infrared television cameras, but is not restricted to such cameras.

The essential features of the invention are set forth in the appended claims.

The invention will now be described in more detail with reference to the accompanying drawings which show an embodiment of the present invention, by way of example only.

In the drawing:

FIG. 4 shows a block diagram of a circuit system for amplitude selection within an amplitude selection range having predetermined limits;

FIG. 4a shows several curves of selected amplitude levels; and

Figure 1:
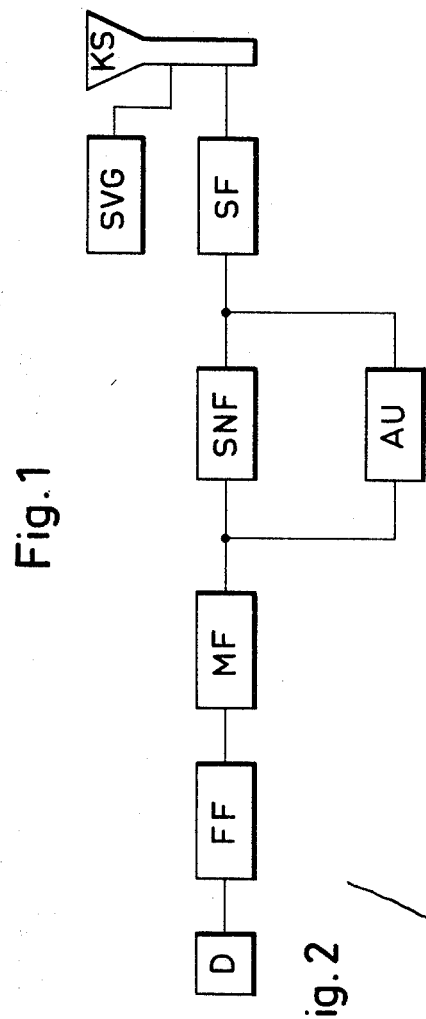
FIG. 1 is a block diagram which shows diagrammatically an infrared television camera including the system of the invention.

The block diagram of FIG. 1 is shown in conjunction with an infrared television camera, the optical scanning members, usually comprised of mirrors, being omitted. The scanning beam, which includes rays within the infrared range, for instance within the range of 2—5 $\mu$m., impinges on a detector D. In practice, the detector is often comprised of a crystal of InSb, which to obtain improved signal-noise conditions is usually kept cold by means of liquid nitrogen whereby a temperature of about −195° C. is obtained. A signal is obtained from the detector, the amplitude of which varies in accordance with the temperature at the point from which the radiation emanates.

Figure 2:
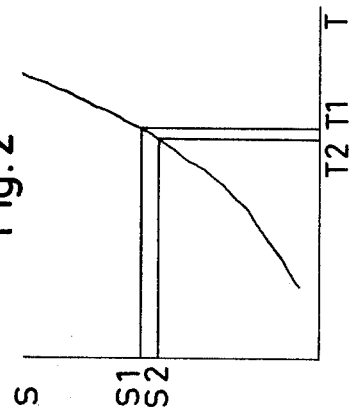
FIG. 2 shows the relationship between the amplitude of the output signal of a heat radiation detector and the temperature at the point at which the radiation originates.

FIG. 2 shows a curve which for a specific detector gives the amplitude S of the output signal as a function of the temperature T of the heat-radiating point.

Detector D in FIG. 1 is connected to an amplifier FF and an intermediate amplifier MF, a so-called black level amplifier SNF, and a final amplifier SF from which amplified signals are fed to an intensity control electrode in a cathode-ray tube KS.

The electron beam of this cathode-ray tube is deflected in an infrared television camera vertically—for dividing up the image—and horizontally—for dividing the rows—and this is effected by applying to the deflection electrodes of the cathode-ray tube deflection signals from a deflection means SVG which in the present instance must emit deflection signals for the vertical deflection as well as the horizontal deflection.

By means of the described system, a picture is obtained on the screen of the cathode-ray tube which, since it appears within the previously disclosed range because of the infrared radiation, naturally does not completely correspond to a simultaneous photographic image of the same object but, however, it has such great similarities that a comprehensive identification of separate details is possible for medical or technical purposes, for instance.

Circuit components and circuit connections suitable for the aforedescribed arrangement are well known in the art and need not be described in detail.

As already mentioned, the amplitude of the signal output of the detector is indicative of the temperature at the point at which the hear radiation originates.

Let it now be assumed that it is desired to obtain on the picture screen of the cathode-ray tube KS a distinct indication of the points on the scanned object which have a temperature within the temperature limits T1 and T2. As can be seen from FIG. 2, this temperature range corresponds to signals from the detector having amplitudes between limits S1 and S2.

The problem which the present invention solves is to ensure that all signals arriving from the detector and lying within the amplitude limits S1 and S2 cause a limit value— for instance white or black—with respect to the points on the picture screen impinged upon by the electron beam, so that what is generally called "the reproduction of the thermic band" is obtained.

For this purpose a network AU is connected in parallel with an amplifier, in this case with the black level amplifier SNF. The network AU will now be described in more detail.

Figure 3:
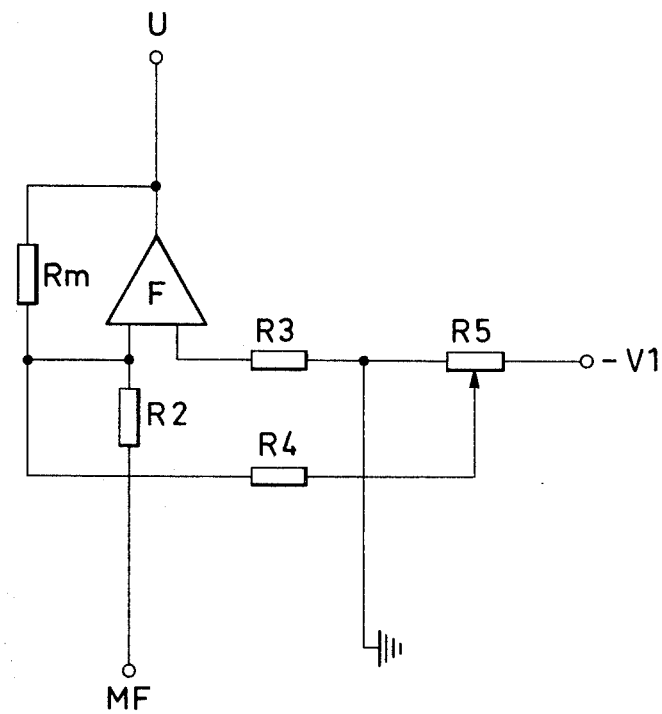
FIG. 3 shows a circuit diagram for determining the position of the amplitude selection range.
Figure 3A:
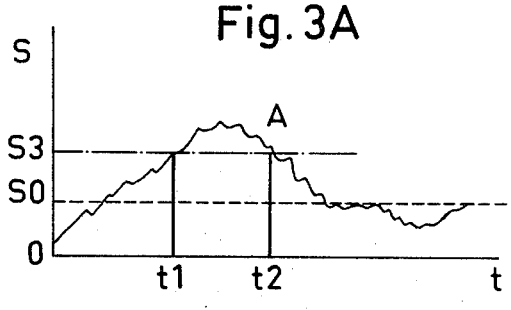
FIG. 3a shows the shape of the signal generated by the detector.

FIG. 3a shows the signal generated by detector D as a curve A which is a function of time or in other words a function of a scanning, for instance, of a horizontal row reproduced on the picture screen of the cathode-ray tube by a line, the blackness or density of which varies in accordance with curve A.

The sections which lie at a certain level are to be selected from the curve A, the portion designated S3 being the one of interest in the present case. It is evident from FIG. 3a that the curve A has the selected level or amplitude S3 at the times $t1$ and $t2$. When the signal generated by the detector passes through the selected amplitude or level, the amplitude selection circuit has to become operative to cause a completely bright or dark point on the picture screen.

Naturally, it is desirable that the selected level or amplitude—S3 in the present case—is capable of being set for a selected value and the circuitry shown in FIG. 3 is used for this purpose.

The circuit arrangement shown in FIG. 3 has an input MF which should be visualized as being connected to the output of intermediate amplifier MF in the manner shown in FIG. 1. The output U of the circuitry shown in FIG. 3 is connected to the input I of the circuit arrangement shown in FIGS. 4 and 5 and sends an appropriate signal to the last mentioned circuitry.

The circuitry shown in FIG. 3 comprises an operational amplifier F which has two inputs and is connected between input MF and output U. The signal coming from the detector passes from the input MF via a resistor R2 to a first input of operational amplifier F and ground potential is passed to the second input of operational amplifier F, via a resistor R3. The operational amplifier F has also negative feedback between its output U and its first input, by means of a resistor RM. Connected between ground and a low voltage, designated $-V1$, is a potentiometer R5 having a movable tap connected to first input of operational amplifier F via a resistor R4.

Accordingly, the level of the amplified signal feedback from the amplifier F can be set by means of the potentiometer R5 so that when this signal corresponds to the area at S3 in FIG. 3a it has a value which lies within the working limits of, for instance, $\pm 2.5$ volts in relation to a reference level for the circuitry according to FIGS. 4 and 5, so that the last mentioned circuitry produces a limit value in a manner which will be described later on. As a result, the output signal from FIGS. 4 and 5 respectively, which is passed together with the total signal to—in this case—the final amplifier SF (FIG. 1), tenders the normal signal inoperative in the final amplifier thereby causing a completely light or completely dark point on the picture screen. The manner in which the limit value is obtained will now be described with reference to the block diagram of FIG. 4 and the detailed diagram of FIG. 5.

FIG. 4a shows curves for a number of representative settings. The solid horizontal line 0 represents the selected reference level which corresponds to a certain radiation temperature, and the limits for the range within which it is desired to obtain a limit value to be applied to the control electrode of the cathode ray tube, are represented by the dashed lines $+V$ and $-V$. Three settings are shown. Setting 1 shows a signal starting below the lower limit $-V$, passes through the range and continuing towards higher values. It is evident that it is desirable to obtain the limit value between the points $t1a$ and $t1b$. In the second setting 2 the signal rises from a value below the range into the range and then drops below the range. For this setting, the limit value between points $t2a$ and $t2b$ is to be obtained. In the setting 3, a signal is shown which rises from a value lying below the range through the range to values above said range and then returns to values below the range. As is evident, it is desirable to obtain the limit value between points $t3a$ and $t3b$, and similarly between $t3c$ and $t3d$, but not between the points $t3b$ and $t3c$.

FIG. 4 shows a circuit for producing the limit value previously referred to. Signals from a point I presumed to be connected with point U in FIG. 3, are fed via the resistors R6, R7, R8 and R9, R10, R11 to bistable differential amplifiers D1 and D2 respectively, hereinafter called differential amplifiers. In the exemplified operation, the conditions are such that a signal applied to the differential amplifier D2 causes an output signal from that amplifier when the signal exceeds the limit $-V$, and this output signal prevails for all signals located above the $-V$ limit, and thus also when the signal exceeds the limit $+V$.

The signal passed to differential amplifier D1 through resistors R6, R7 and R8 causes an output signal from the amplifier in the case of such signals only which are above the limit $+V$. The signals from differential amplifier D1 are passed via an amplifier F1 to differential amplifier D2 in such a way that the output signal from amplifier D2 is present for all signals above $-V$ but below $+V$. This is accomplished by means of the output signal from amplifier D1 in combination with amplifier F1 causing the output signal from amplifier D2 to be cancelled when a signal situated above the limit $+V$ appears. Thus, by passing the resulting output signal from the differential amplifier D2, whereby the output signal is only present when there is a signal with a value over $-V$ but below $+V$ but not when there is present a signal below $-V$ or above $+V$, the desired signal is obtainable from a bistable trigger amplifier D3, namely an output signal from amplifier D3 occuring solely for signals applied to the input I and having a value between the limits $-V$ and $+V$.

It is simple to arrange an amplification such that the output signal from amplifier D3 when it is applied to the final amplifier SF (See FIG. 1) together with the "complete" signals arriving from the amplifier SNF will dominate these signals by driving the control electrode of the cathode-ray tube either to a positive limit value, at which an intensively bright point is obtained on the screen, or to a negative limit value, in which case the screen spot in question becomes dark. The intended result has thus been obtained.

Figure 5:
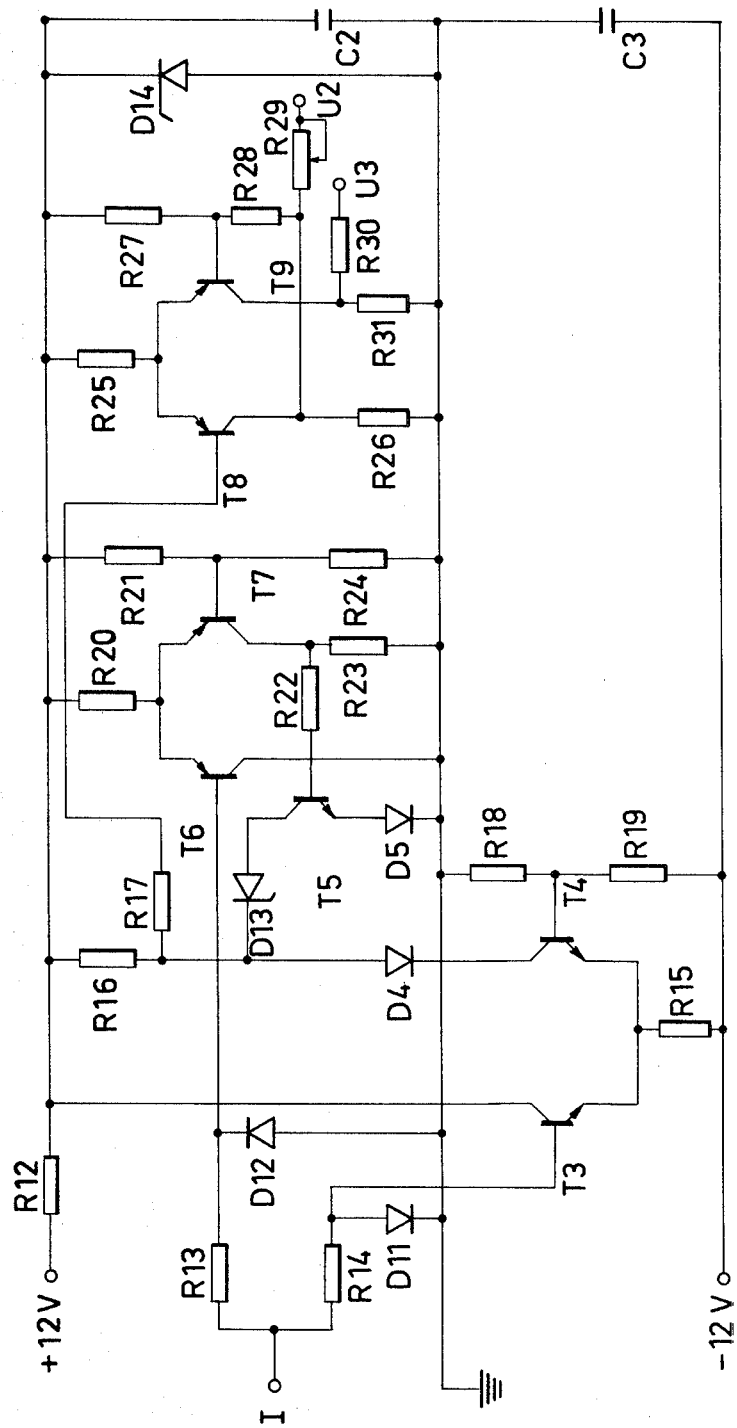
FIG. 5 is a more detailed diagram of the circuit system of FIG. 4.

FIG. 5 illustrates in greater detail the circuit of the arrangement shown diagrammatically in FIG. 4.

It is assumed that the signal applied to input I has, initially, a considerable negative value relative to ground potential, and rises to ground potential to pass to considerable positive values, relative to ground potential.

The differential amplifier corresponding to amplifier D2 in FIG. 4 and comprising NPN transistors T3 and T4 will be described first. The base of transistor T4 is supplied with a given negative voltage through resistors R18 and R19, and transistor T4 draws current via a resistor R16, a diode D4 and a resistor R15, the current adjusting itself so that owing to the voltage drop across resistor R15 the emitter electrodes of transistors T3 and T4 have approximately the same voltage as the base of transistors T4. The junction between resistors R16 and R17 will be at a higher voltage than the base of transistor T4 but the voltage drops across a transistor and a diode are small. As the signal at the input I becomes less and less negative relative to ground potential, a point is reached at which the heretofore nonconductive transistor T3 becomes conductive and within a short period of time causes a voltage drop across resistor R15 of a magnitude such that the emitter of transistor T4 becomes positive relative to the base of transistor T4 having a fixed voltage. The current through transistor T4 now drops to zero, the voltage drop across resistor R16 is also zero and the connecting point between resistors R16 and R17 obtain a high positive level.

This condition prevails when the signal at input I increases in the direction towards more positive values. The voltage at the base of transistor T3 is blocked by a resistor R14 and diode D11 from obtaining more positive values than ground potential.

When the signal applied to input I is changing towards ground potential and more positive values the base of transistor T6 due to a resistor R13 and a diode D12, has been held at approximately ground potential but can, together with the signal, rise to values above ground potential.

A transistor T6 together with a PNP transistor T7 constitutes part of another differential amplifier, which corresponds to amplifier D1 in FIG. 4. With the base of transistor T6 at ground potential current passes through transistor T6 and causes a voltage drop of such magnitude across a resistor R20 that the emitter of transistor T6 is slightly above ground potential. The base of a transistor T7 has, by means of resistors R21 and R24 obtained a positive bias, due to the fact that the emitter of transistor T7 joined with the emitter of transistor T6 initially has almost ground potential. Hence, transistor T7 is nonconductive and does not, therefore, cause a voltage drop across a resistor R23. When the signal at the input I changes towards more positive values a voltage appears at the base of transistor T6 such that the current through this transistor falls and finally ceases altogether. The voltage drop across resistor R20 now decreases to such an extent that transistor T7 become conductive and thereby causes a voltage drop across resistor R23, which corresponds approximately to the voltage at the base of transistor T7. An output signal thus appears across resistor R23 from and including a certain positive voltage at the input I, and remains for all more positive voltages at input I.

It has already been described how from and including a certain negative voltage relative to the ground potential, and for more positive voltages with respect to the last-mentioned voltage, an output signal in the form of an increase of voltage at the junction point between resistors R16 and R17 to a considerable positive value substantially coinciding with the supply voltage has appeared at input I. It is now desired to terminate this output signal from transistor T4 when the voltage at input I has become so positive that an output signal has arisen for the transistor T7 in the form of a positive voltage at the upper end of resistor R3. To attain this desideratum the just-mentioned positive voltage at the upper end of resistor R23 is passed, via a resistor R22, to the base of the NPN transistor T5, which thereby becomes conductive and open a current path via resistor R16 and diode D13—a Zener diode to obtain fixed voltage conditions—transistor T5 and diode D5. Another voltage drop occurs across resistor R16 and the junction point between resistors R16 and R17 obtains a lower voltage than when the voltage at input I was such that transistor T4 was nonconducting.

Thus, at a certain considerable negative voltage, with respect to ground potential, at the input I the junction point between resistors R16 and R17 has a voltage lower than the supply voltage to pass from and including a certain negative (with respect to ground potential) voltage at input I which can be considered as corresponding to −V in FIG. 4, to a considerable positive voltage substantially coinciding with the supply voltage which remains until the voltage at said junction falls again to a lower value than the supply voltage, for a voltage at input I which exceeds a positive value (+V in FIG. 4) with respect to ground potential.

To permit utilization of the varying voltage conditions at the junction point between resistors R16 and R17 a third differential amplifier corresponding to D3 in FIG. 4 is provided. This third amplifier includes two PNP-type transistors T8 and T9. The two transistors are, via a resistor R25, connected with their intercoupled emitter electrodes to the positive supply voltage and each is provided with a collector resistor R26 and R31, respectively. The transistor T8 obtains, via resistor R17, at its base the voltage at the junction point between resistors R16 and R17. The base of transistor T9 obtains, by means of resistors R27 and R28 which are connected in series with resistor R26 for transistor T8, a suitable bias as well as the voltage variations appearing across resistor R26 upon functioning of the transistor T8.

When the voltage at the junction point between resistors R16 and R17 is low, transistor T8 will draw current and cause a certain voltage drop across resistor R26 and due to this voltage drop and the additional voltage drops occuring across resistor R28, the current through transistor T9 becomes very low or zero and the voltage drop across resistor R31 very small. The voltage at the point U3 will differ only slightly from ground potential. The voltage at point U2 will have a definite positive value due to the voltage drop across resistor R26.

When, due to the face that transistor T4 is nonconducting, the voltage at the junction point between resistors R16 and R17 has reached a value closer to the positive supply voltage, it is obvious that the flow of current through transistor T8 will cease and the voltage drop across resistor R26 disappear to a large extent, and the point U2 obtains ground potential. Simultaneously, the passage of current through the transistor T9 will increase and a considerable voltage drop will occur across resistors R31, whereby the point U3 will change from about ground potential to a positive value.

When transistor T5 has become conductive for values at the input exceeding the value of +V the voltage at the junction point between resistors R16 and R17 drops to a lower positive value, in accordance with the aforesaid, This positive value is selected so low that the transistor T8 draws current and causes a voltage drop across resistor R26 and thereby the subsequent actuation of transistor T9 in a manner such as previously described for the case when due to the fact that transistor T4 is conducting, the junction point between resistors R16 and R17 has a low voltage; i.e., output point U2 now changes to a positive value and point U3 to approximately ground potential.

Accordingly, the output point U2 now has a positive value for signals at input I which are more negative than the value −V and for values between −V and +V approximately ground potential is present, whereas for more positive values than +V the voltage at the output point U2 again changes to a positive value.

With regard to the output point U3 for signals at input I which are below −V, approximately ground potential is present; whereas for signals within the range between −V and +V a positive voltage exists, and for signals more positive than +V ground potential is again present at output point U3.

It is thus evident that signals are available at the output points U2 and U3 which within the range −V and +V have a first value but outside this range another value. For output point U2 the first value is about equal to ground potential and the second value is positive, whereas for output point U3 the first value is positive and the second value corresponds approximately to ground potential. The signal is passed in the manner shown in FIG. 1, from output point U2 or output point U3 to the final amplifier SF and is thus sufficiently powerful to overcome the signal arriving from amplifier SNF. The last-mentioned signal includes the complete amplitude range scanned, so as for instance, to bring the control electrode in the cathode ray tube KS to full current for signals having values between −V and +V which signals correspond to a bright light spot on the image screen.

Consequently, the described arrangement permits the selection and indication of signals corresponding to a narrow, selected amplitude band or thermic band on the screen of the cathode-ray tube.

Finally, it should be mentioned that some of the diodes shown in FIG. 5 have not been described since they are provided for safety purposes and for voltage stabilization only, and are thus not essential for a circuit system according to the present invention.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What we claim is:

1. A circuit system for producing an output signal from a variable amplitude input signal only when the amplitude of said variable amplitude input signal is within a selected range, said circuit comprising in combination;

first circuit means for producing a first auxiliary signal having a substantially constant amplitude in response to the amplitude of the variable amplitude input signal ranging form a lower limit of said selected range up to and past an upper limit of said selected range, said first circuit means comprising a first bistable differential amplifying means which comprise two transistors, each of said transistors having a base, a collector and an emitter, a common resistance means connected to the emitters, the base of one of said transistors being adapted to receive the variable amplitude input signal, means for applying a constant bias to the base of the other of said transistors, a collector resistance means connected to the collector of said other transistor whereby the first auxiliary signal is generated in accordance with the state of conduction of said other transistor;

second circuit means for producing a second auxiliary signal having a substantially constant amplitude in response to the amplitude of the variable amplitude input signal ranging from above said upper limit, said second circuit means comprising second bistable differential amplifying means which comprises two transistors, each of said transistors having a base, a collector and an emitter, a common resistance means connected to the emitters, the base of one of said transistors being adapted to receive the variable amplitude input signal, means for applying a constant bias to the base of the other of said transistors, a collector resistance means connected to the collector of said other transistor whereby the second auxiliary signal is generated in accordance with the state of conduction of said other transistor;

A first signal-limiting means connected to the bases of said one transistors for limiting the variable amplitude input signal to a particular value between said limits; and third circuit means for generating the output signal only when the first auxiliary signal is generated in the absence of the second auxiliary signal.

2. A circuit system according to claim 1 wherein said signal-limiting means comprises a resistance means (R13, R14) connected between a source (1) of amplitude variable signals and the base of said one transistors (T3, T6), and wherein diode means (D11, D12) are connected between said base and a point of constant potential.

3. A circuit system for producing an output signal from a variable amplitude input signal only when the amplitude of said variable amplitude input signal is within a selected range, said circuit comprising in combination:

first circuit means for producing a first auxiliary signal having a substantially constant amplitude in response to the amplitude of the variable amplitude input signal ranging from a lower limit of said selected range up to and past an upper limit of said selected range, said first circuit means comprising a first bistable differential amplifying means which comprises two transistors, each of said transistors having a base, a collector and an emitter, a common resistance means connected to the emitters, the base of one of said transistors being adapted to receive the variable amplitude input signal, means for applying a constant bias to the base of the other of said transistors, a collector resistance means connected to the collector of said other transistor whereby the first auxiliary signal is generated in accordance with the state of conduction of said other transistor;

second circuit means for producing a second auxiliary signal having a substantially constant amplitude in response to the amplitude of the variable amplitude input signal ranging above said upper limit, said second circuit means comprising a second bistable differential amplifying means which comprises two transistors, each of said transistors having a base, a collector and an emitter, a common resistance means connected to the emitters, the base of one of said transistors being adapted to receive the variable amplitude input signal, means for applying a constant bias to the base of the other of said transistors, a collector resistance means connected to the collector of said other transistor whereby the second auxiliary signal is generated in accordance with the state of conduction of said other transistor; and a third circuit means comprising an amplifying means connected to said second bistable differential amplifying means to receive therefrom the second auxiliary signal and transmit the same to said first bistable differential amplifying means for terminating the first auxiliary signal when present during the presence of the second auxiliary signal.

4. A circuit system according to claim 3 wherein said amplifying means comprises a further transistor having a base, an emitter and a collector, the base of said further transistor being connected in circuit with a resistance means and the collector of said other transistor of said second bistable differential amplifying means and the emitter-collector of said further transistor being connected in circuit with the collector of said other transistor of said first bistable differential amplifying means.

5. A circuit system according to claim 4 wherein said further transistor of said amplifying means is connected with said other transistor of said first bistable differential amplifying means via at least one diode.

6. A circuit system according to claim 4 wherein said further transistor of said amplifying means is connected with said other transistor of said first bistable differential amplifying means via at least one Zener diode.

7. A circuit system according to claim 3 further comprising a phase conversion means, said first auxiliary signal produced by the respective bistable differential amplifying means and capable of being terminated by the appearance of the second auxiliary signal being fed to said phase conversion means for causing the output signal to have a predetermined characteristic.

8. A circuit system according to claim 7 wherein said output signal is characterized by the presence of current.

9. A circuit system according to claim 7 wherein said output signal is characterized by the absence of current.

10. A circuit system according to claim 7 wherein said output signal is characterized by a positive voltage signal.

11. A circuit system according to claim 7 wherein said output signal is characterized by a negative voltage signal.

12. A circuit system according to claim 7 wherein said phase conversion means comprises a bistable trigger amplifying means including first and second transistors, each having a base, an emitter and a collector. a common emitter resistance means connected to the emitters of said first and second transistors, a first and second collector resistance means connected to the collectors of said first and second transistors, respectively, the voltage drop across said first and second collector resistance means being selectable as the output signal having the predetermined characteristic, means for connecting the base of said first transistor to said first bistable differential amplifying means, and means for connecting the collector of said first transistor to the base of said second transistor whereby the voltage drop across said first collector resistance means is applied to the base of said second transistor.